United States Patent
Tung et al.

(10) Patent No.: US 12,446,927 B2
(45) Date of Patent: Oct. 21, 2025

(54) SPINE CONNECTING ROD

(71) Applicant: Socko Medical Co., Ltd., New Taipei (TW)

(72) Inventors: Jung-Tsou Tung, New Taipei (TW); Chang-Yi Kuo, New Taipei (TW); Ming-Feng Ke, New Taipei (TW)

(73) Assignee: Socko Medical Co., Ltd., New Taipei (TW)

( * ) Notice: Subject to any disclaimer, the term of this patent is extended or adjusted under 35 U.S.C. 154(b) by 661 days.

(21) Appl. No.: 17/867,831

(22) Filed: Jul. 19, 2022

(65) Prior Publication Data
US 2023/0320759 A1    Oct. 12, 2023

(30) Foreign Application Priority Data
Apr. 7, 2022  (TW) .................................. 111113189

(51) Int. Cl.
*A61B 17/70*   (2006.01)
*A61B 17/00*   (2006.01)

(52) U.S. Cl.
CPC ....... *A61B 17/7023* (2013.01); *A61B 2017/00862* (2013.01)

(58) Field of Classification Search
CPC ...... A61B 17/7023; A61B 2017/00862; A61B 17/7028
See application file for complete search history.

(56) References Cited

U.S. PATENT DOCUMENTS

| | | | | |
|---|---|---|---|---|
| 2007/0233087 A1* | 10/2007 | Schlapfer | ........... | A61B 17/7037 606/232 |
| 2007/0288009 A1* | 12/2007 | Brown | ............... | A61B 17/7025 606/279 |
| 2008/0262554 A1* | 10/2008 | Hayes | ................ | A61B 17/7023 606/257 |
| 2010/0042152 A1* | 2/2010 | Semler | ............... | A61B 17/7004 606/246 |
| 2010/0063547 A1* | 3/2010 | Morin | ................ | A61B 17/7023 606/278 |
| 2010/0069964 A1* | 3/2010 | Lechmann | ......... | A61B 17/7025 606/246 |
| 2010/0094306 A1* | 4/2010 | Chang | ................ | A61B 17/7023 606/90 |

* cited by examiner

*Primary Examiner* — Erin Mcgrath
(74) *Attorney, Agent, or Firm* — Troutman Pepper Locke LLP; Tim Tingkang Xia, Esq.

(57) ABSTRACT

A spine connecting rod includes a coupling assembly, a first rod and a second rod. The coupling assembly includes a cylindrical body having first and second coupling parts and a cylindrical elastic part inside the body. The first rod, pivotally connected with the coupling assembly, has a diameter less than any inner diameter of the elastic part and the first coupling part. One end of the first rod is furnished with a ball having a diameter greater than that of the first rod and any inner diameters of the elastic part and the second coupling part. The second rod is connected with the coupling assembly. The first and second rods protrude out of the first and second coupling parts, respectively. The ball of the first rod is rotationally disposed inside the coupling assembly to allow the first rod to undergo elastic movements via the elastic part.

8 Claims, 13 Drawing Sheets

US 12,446,927 B2

SPINE CONNECTING ROD

CROSS REFERENCE TO RELATED APPLICATION

This application claims the benefits of Taiwan application Serial No. 111113189, filed on Apr. 7, 2022, the disclosures of which are incorporated by references herein in its entirety.

TECHNICAL FIELD

The present disclosure relates in general to a medical technology, and more particularly to a spine connecting rod applied to fix the spines.

BACKGROUND

For patients with spinal disorders, problems such as displacement, pathological changes and/or atrophy are easily developed at the intervertebral discs, from which reduction at spacing between neighboring spinal process to depress spinal nerves would be possible to cause paralysis or pain at the back.

In order to solve the aforesaid problems, a current treatment uses screws to implant connecting rods to the spines for supporting relative distances and positions among these spines.

As far as the structure of the connecting rod is concerned, based on factors such as fixation effect, patient comfort, and vertebral body growth and recovery, a two-segmented connecting rod has been introduced recently. This type of connecting rod mainly integrates a sphere and elastic components to form the two-segmented connecting rod. With the sphere as a center for allowing the connecting rod to rotate universally, the two-segmented connecting rod can undergo relative motions to another connecting rod via the elastic components.

Since the aforesaid two-segmented connecting rod is different from the traditional rigid or soft connector in both fixation and comfort, so it is widely accepted.

Nevertheless, structuring of the aforesaid two-segmented connecting rod is complicated, and its volume cannot be effectively reduced. As a result, after this connecting rod is implanted to patient's spine, the patient is prone to have a feel of a foreign body at the spine. However, if the size of this connecting rod is purposely reduced, the strength thereof would become a concern. Although a metallic material with high strength can be used, yet additional difficulty and cost in manufacturing would be inevitable.

Therefore, how to develop a "spine connecting rod" with a simple structure, good fixation effect, and improved patient comfort is an urgent problem to be solved to the skill in the related art.

SUMMARY

In this disclosure, a spine connecting rod comprises:
a coupling assembly, including:
  a body, shaped as a cylinder, formed by integrating a first cylindrical coupling part and a second cylindrical coupling part, having an axis of body parallel to a first direction; and at least one elastic part, shaped as a cylinder, disposed inside the body to provide spring forcing parallel to the first direction;
a first rod, pivotally connected with the coupling assembly, having a first axis, a diameter of the first rod being less than any of inner diameters of the at least one elastic part and the first cylindrical coupling part, one end of the first rod being furnished with a ball having a center located at the first axis, a diameter of the ball being greater than the diameter of the first rod, the diameter of the ball being greater than any of inner diameters of the at least one elastic part and the second cylindrical coupling part; and
a second rod, connected with the coupling assembly, having a second axis;
wherein the first rod and the second rod protrude out of the first coupling part and the second coupling part, respectively, the first axis and the second axis are both parallel to the first direction, the ball of the first rod is rotationally disposed inside the coupling assembly so as to allow the first rod to rotate or/and swing about the ball, and the first rod is able to undergo elastic movements parallel to the first direction by the spring forcing provided by the at least one elastic part.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
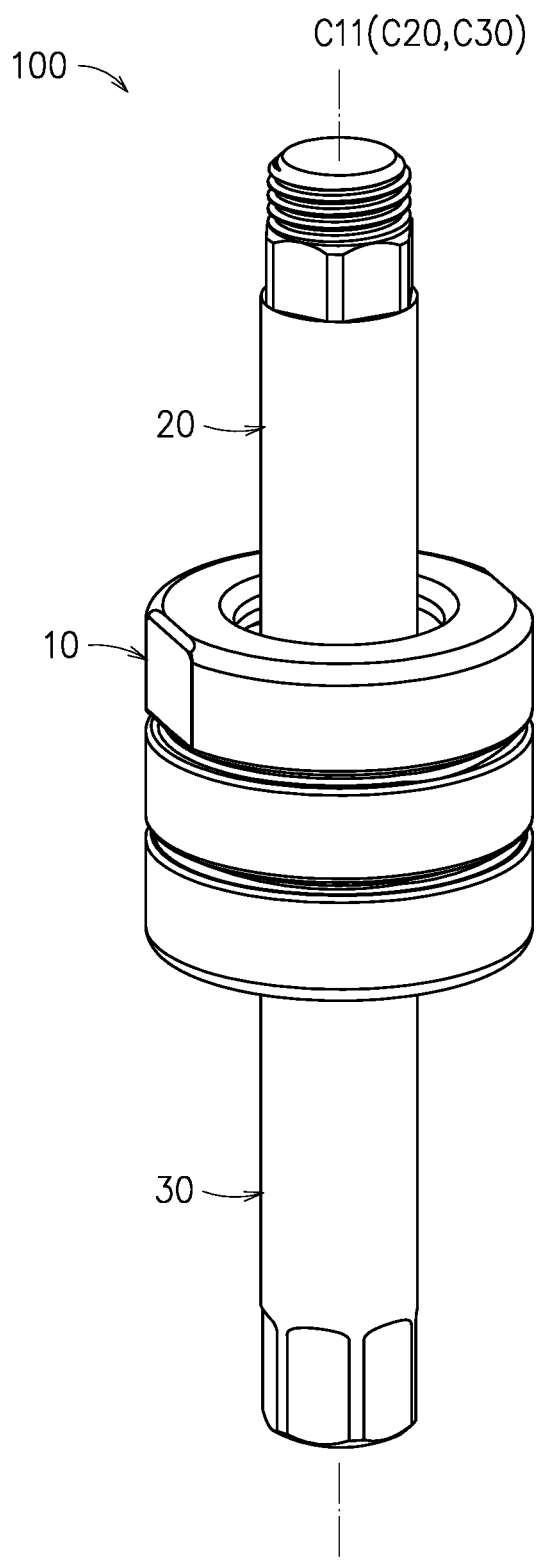
FIG. 1 is a schematic perspective view of an embodiment of the spine connecting rod in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Referring to FIG. 1, FIG. 2, FIG. 3 and FIG. 3A, an embodiment of a spine connecting rod 100 includes a coupling assembly 10, a first rod 20 and a second rod 30.

The coupling assembly 10 includes a body 11 and an elastic part 12 disposed inside the body 11.

The body 11, shaped as a cylinder, is formed by engaging a first cylindrical coupling part 111 and a second cylindrical coupling part 112.

The body 11 has an axis of body C11 parallel to a first direction F1.

The first rod 20 is pivotally connected with the coupling assembly 10. The first rod 20 has a first axis C20. A diameter D20 of the first rod 20 is less than an inner diameter D12 of the elastic part 12, and also less than an inner diameter D111 of the first coupling part 111.

Figure 3:
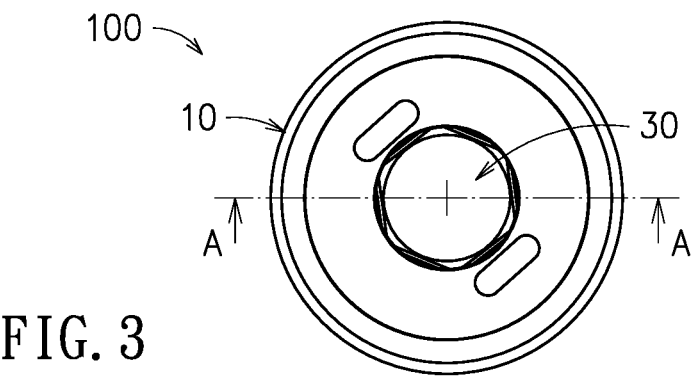
FIG. 3 is a schematic bottom view of FIG. 1.
Figure 3A:
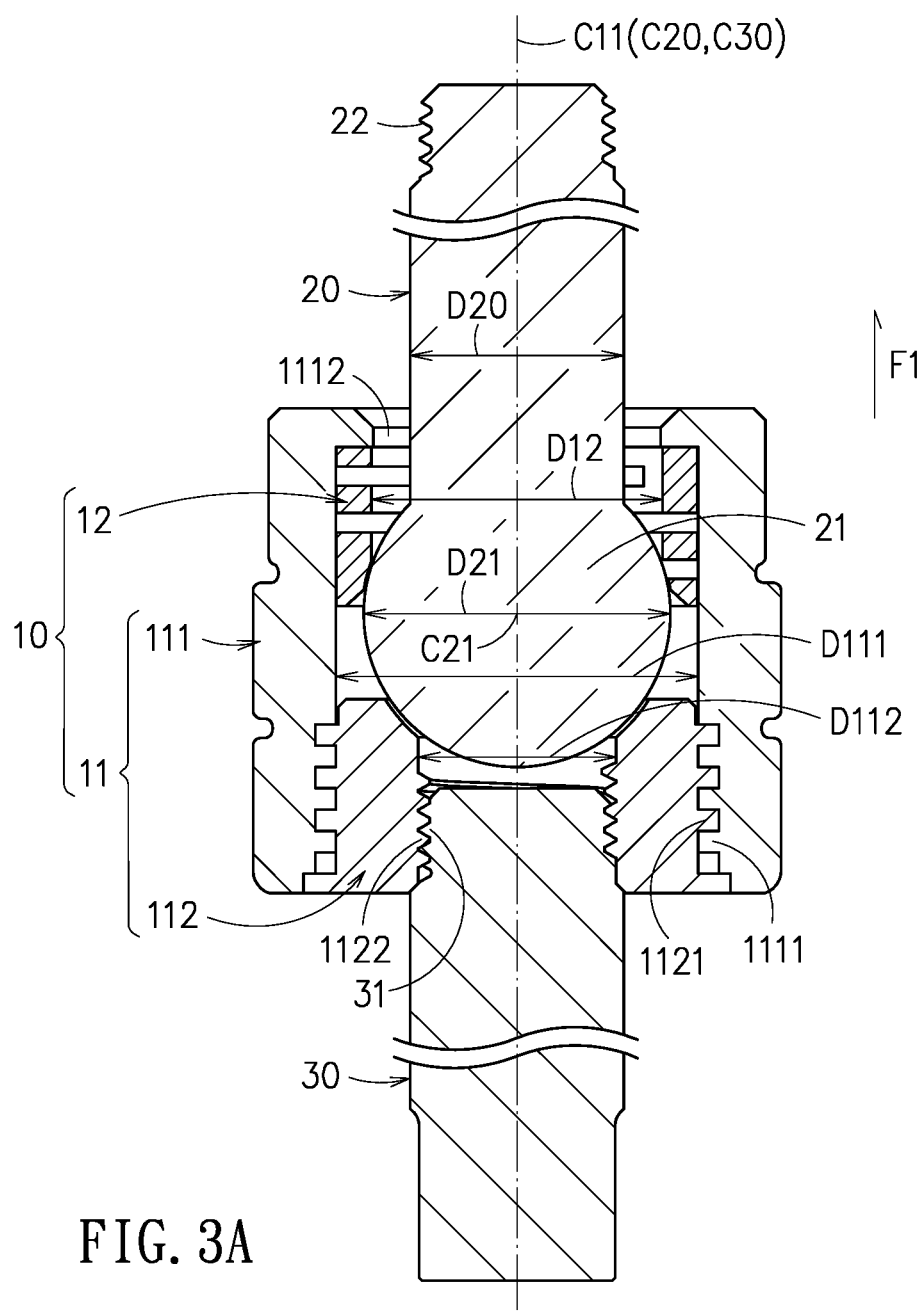
FIG. 3A is a schematic cross-sectional view of FIG. 3 along line A-A.

As shown in FIG. 3A, the first coupling part 111 has an inner flange 1112. The elastic part 12, shaped as a cylinder, is contacted onto a bottom portion of the inner flange 1112 to provide a spring force parallel to the first direction F1.

The first rod 20 extends along the first axis C20 to have an end furnished with a ball 21, while another end thereof (i.e., a top end of the first rod 20 in FIG. 2) is furnished with a third external thread 22. Details about the third external thread 22 will be elucidated thereafter.

A center C21 of the ball 21 is located at the first axis C20. Particularly, a diameter diameter D21 of the ball 21 is greater than the diameter D20 of the first rod 20, and also greater than any of inner diameters D12, D112 of the elastic part 12 and the second coupling part 112, respectively.

The first rod 20 penetrates through the elastic part 12, and extends out of the first coupling part 111 by having the ball 21 to contact against the bottom portion of the elastic part 12.

The first coupling part 111 is furnished with a first internal thread 1111, and the second coupling part 112 is furnished with a first external thread 1121 for engaging detachably the first internal thread 1111 of the first coupling part 111.

The ball 21 is restrained between the elastic part 12 and the second coupling part 112.

The second rod 30 is defined with a second axis C30. Along the second axis C30, the second rod 30 has one end furnished with a second external thread 31 for engaging a second internal thread 1122 provided to the second coupling part 112.

By engaging the second external thread 31 of the second rod 30 with the second internal thread 1122 of the second coupling part 112, the second rod 30 and the coupling assembly 10 can be connected, with the second rod 30 protruding out of the second coupling part 112.

With the first rod 20 and the second rod 30 to protrude out of the first coupling part 111 and the second coupling part 112, respectively, the first axis C20 and the second axis C30 are both parallel to the first direction F1. Preferably, the first axis C20, the second axis C30, the axis of body C11 and the center C21 of the ball 21 are all coaxial.

Figure 4:
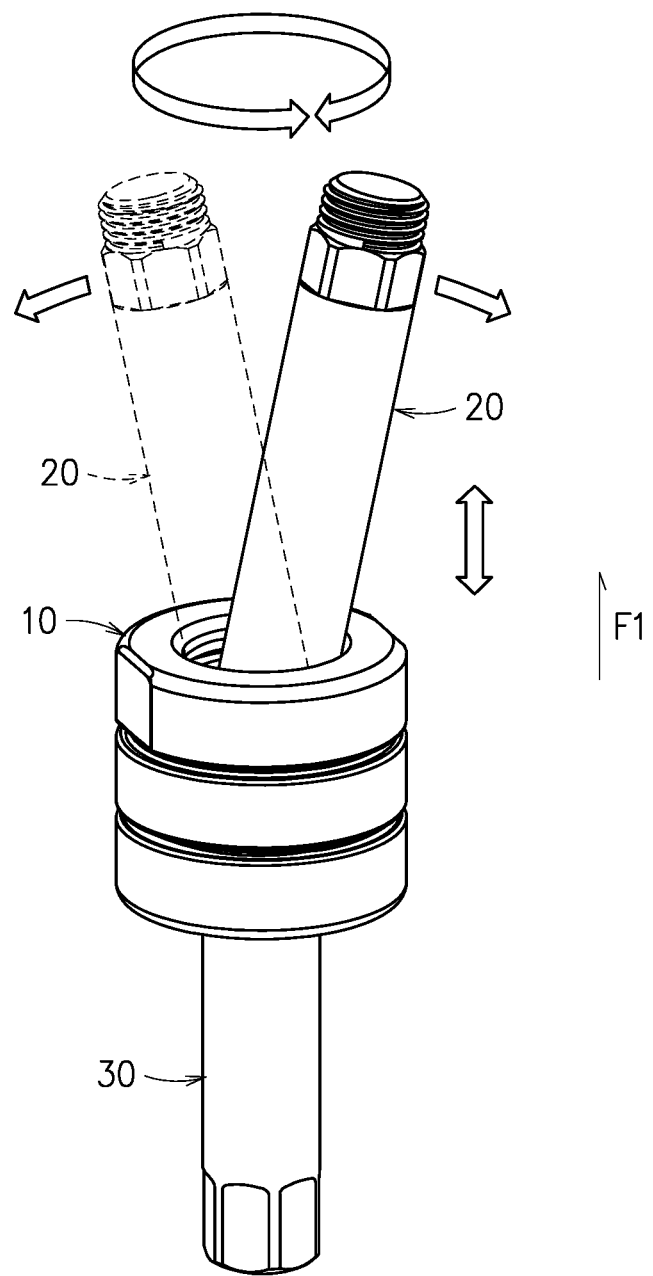
FIG. 4 demonstrates schematically rotations an/or swinging of FIG. 1.

Referring to FIG. 3A and FIG. 4, the ball 21 of the first rod 20 is rotationally disposed inside the coupling assembly 10, such that the first rod 20 can rotate or/and swing about the ball 21. Namely, the first rod 20 can undergo elastic movements parallel to the first direction F1 by the spring force provided by the elastic part 12.

In this disclosure, materials for the first coupling part 111, the second coupling part 112, the elastic part 12, the first rod 20 and the second rod 30 can be biocompatible metals or plastics, but not limited thereto. In addition, the length of the first rod 20 or the second rod 30 is determined according to practical requirements.

Referring to FIG. 5, FIG. 6, FIG. 7 and FIG. 7A, another embodiment of the spine connecting rod 100A includes a coupling assembly 10A, a first rod 20 and a second rod 30.

In this embodiment, the coupling assembly 10A includes a body 11A and two elastic parts 12, 13 disposed inside the body 11A.

The body 11A, shaped as a cylinder, is formed by connecting coaxially a first cylindrical coupling part 111A and a second cylindrical coupling part 112A. Screws (not shown in the figures) can be applied to detachably couple the first coupling part 111A with the second coupling part 112A.

Figure 7:
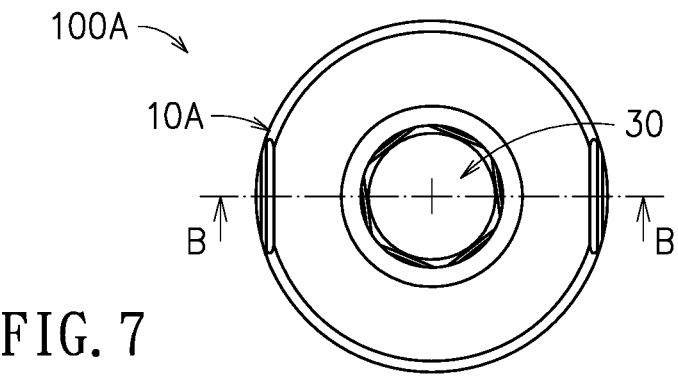
FIG. 7 is a schematic bottom view of FIG. 5.
Figure 7A:
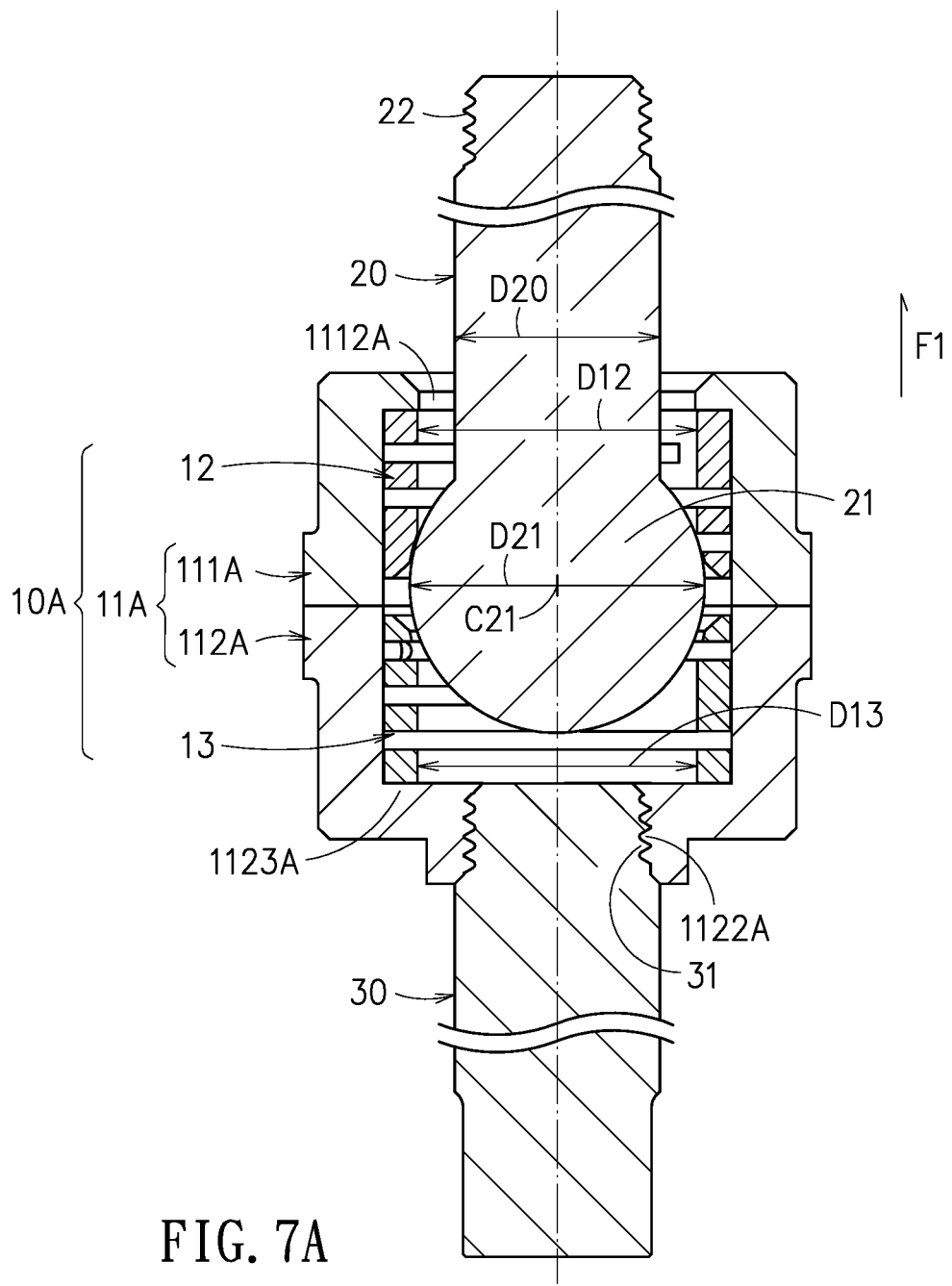
FIG. 7A is a schematic cross-sectional view of FIG. 7 along line B-B.

As shown in FIG. 7A, the first coupling part 111A has an inner flange 1112A. The elastic part 12, shaped as a cylinder, is disposed inside the body 11A by contacting against a bottom portion of the inner flange 1112A, such that a spring force parallel to a first direction F1 can be applied.

Along a first axis C20, the first rod 20 has an end furnished with a ball 21. A diameter D21 of the ball 21 is greater than a diameter D20 of the first rod 20, and also greater than any of inner diameters D12, D13 of the elastic parts 12, 13, respectively.

The first rod 20 extends out of the first coupling part 111A after penetrating through the elastic part 12 by having the ball 21 to contact against the bottom portion of the elastic part 12.

Similarly, the second coupling part 112A has an inner flange 1123A; and, the elastic part 13, shaped as a cylinder, is disposed inside the body 11A by contacting against a top portion of the inner flange 11, such that a spring force parallel to the first direction F1 can be applied.

Screws (not shown in the figures) can be applied to couple the first coupling part 111A with the second coupling part 112A, and the ball 21 is restrained between the two elastic parts 12, 13.

The second rod 30 is defined with a second axis C30. Along the second axis C30, the second rod 30 has an end furnished with a second external thread 31. Correspondingly, the second coupling part 112A is provided with a second internal thread 1122A.

The second external thread 31 of the second rod 30 can be screwed to engage the second internal thread 1122A of the second coupling part 112A, such that the second rod 30 and the coupling assembly 10A can be connected together. In addition, the second rod 30 is extended out of the second coupling part 112A.

Upon such an arrangement, the first rod 20 and the second rod 30 protrude out of the first coupling part 111A and the second coupling part 112A, respectively. Both the first axis C20 and the second axis C30 are parallel to the first direction F1. Preferably, the first axis C20, the second axis C30, the axis of body C11A and the center C21 of the ball 21 are coaxially.

Referring to FIG. 7A, the ball 21 of the first rod 20 is rotationally disposed inside the coupling assembly 10A, such that the first rod 20 can rotate or/and swing about the ball 21. Namely, the first rod 20 can undergo elastic movements parallel to the first direction F1 by the spring forces provided by the elastic parts 12, 13.

In this disclosure, though the coupling assembly 10A of this embodiment and the coupling assembly 10 of FIG. 1 present slight differences in structuring, yet the connection of the first cylindrical coupling part and the second cylindrical coupling part, and the connections to the first rod and the second rod are the same. As such, the first rod can perform the same. Namely, the first rod can rotate or/and swing about the ball. Namely, the first rod can undergo elastic movements by the spring force provided by the elastic part.

Figure 8:
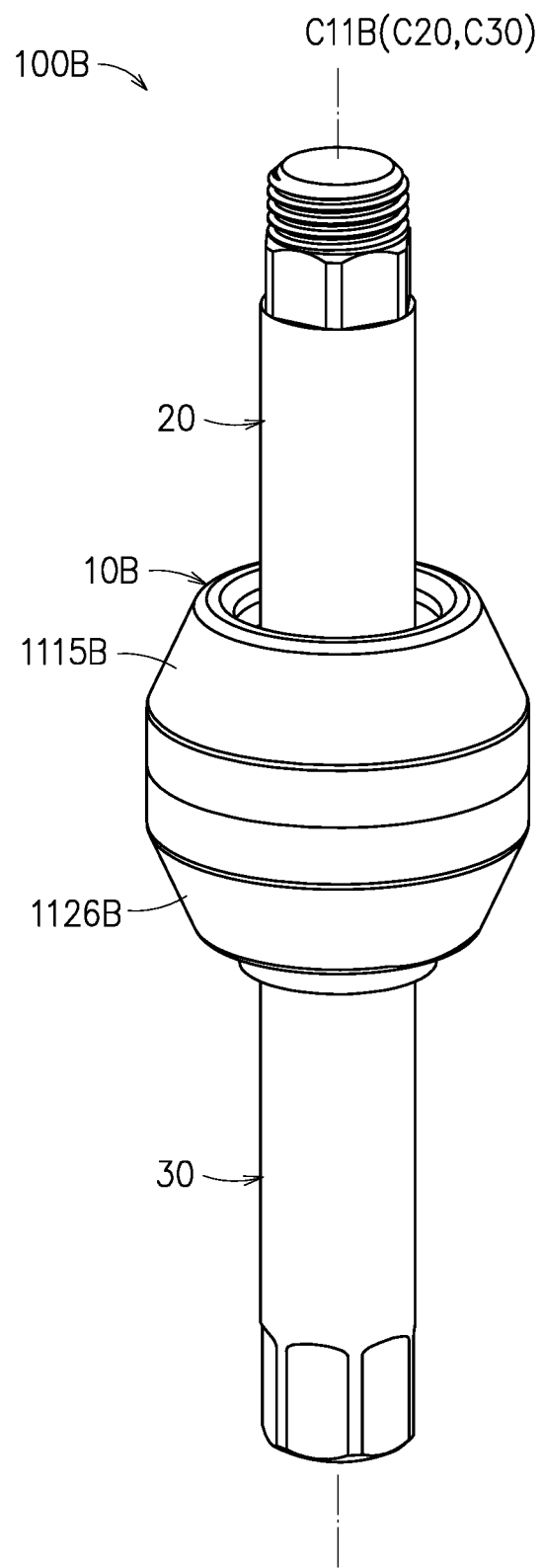
FIG. 8 is a schematic perspective view of a further embodiment of the spine connecting rod in accordance with this disclosure.
Figure 9:
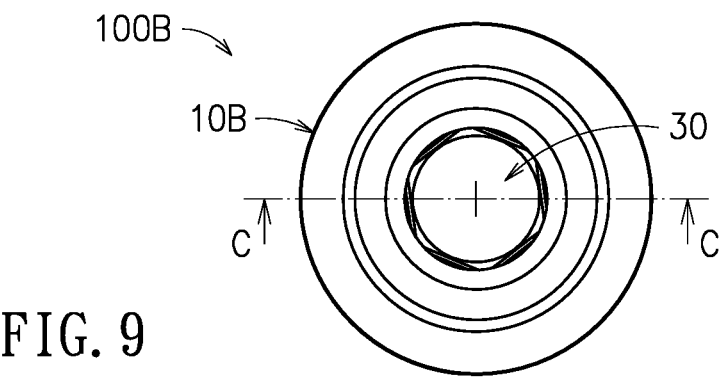
FIG. 9 is a schematic bottom view of FIG. 8.
Figure 9A:
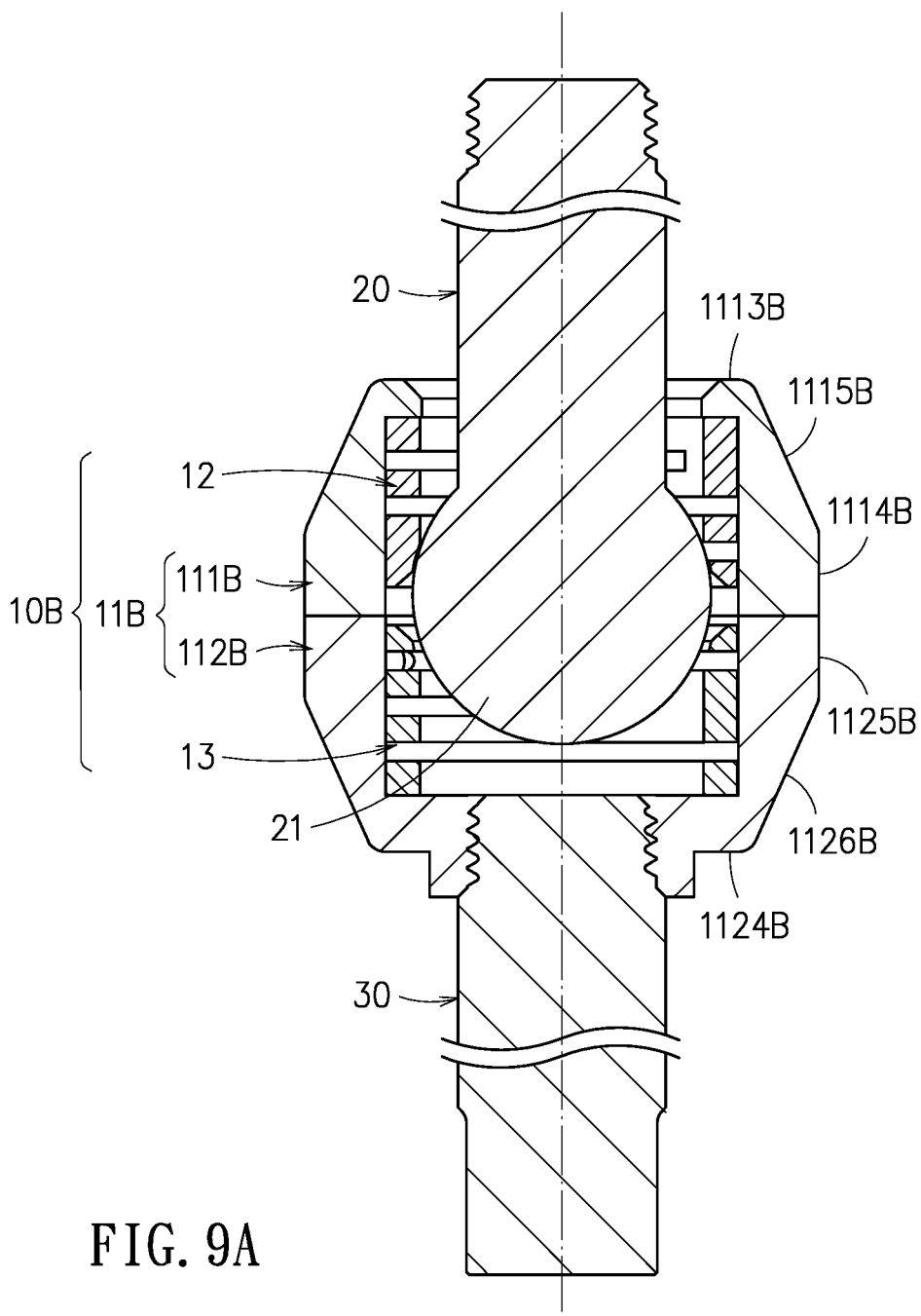
FIG. 9A is a schematic cross-sectional view of FIG. 9 along line C-C.

Referring to the embodiment shown in FIG. 8, FIG. 9 and FIG. 9A, a spine connecting rod 100B includes a coupling assembly 10B, a first rod 20 and a second rod 30.

In this embodiment, the coupling assembly 10B includes a body 11B and two elastic parts 12, 13 disposed inside the body 11B.

Figure 5:
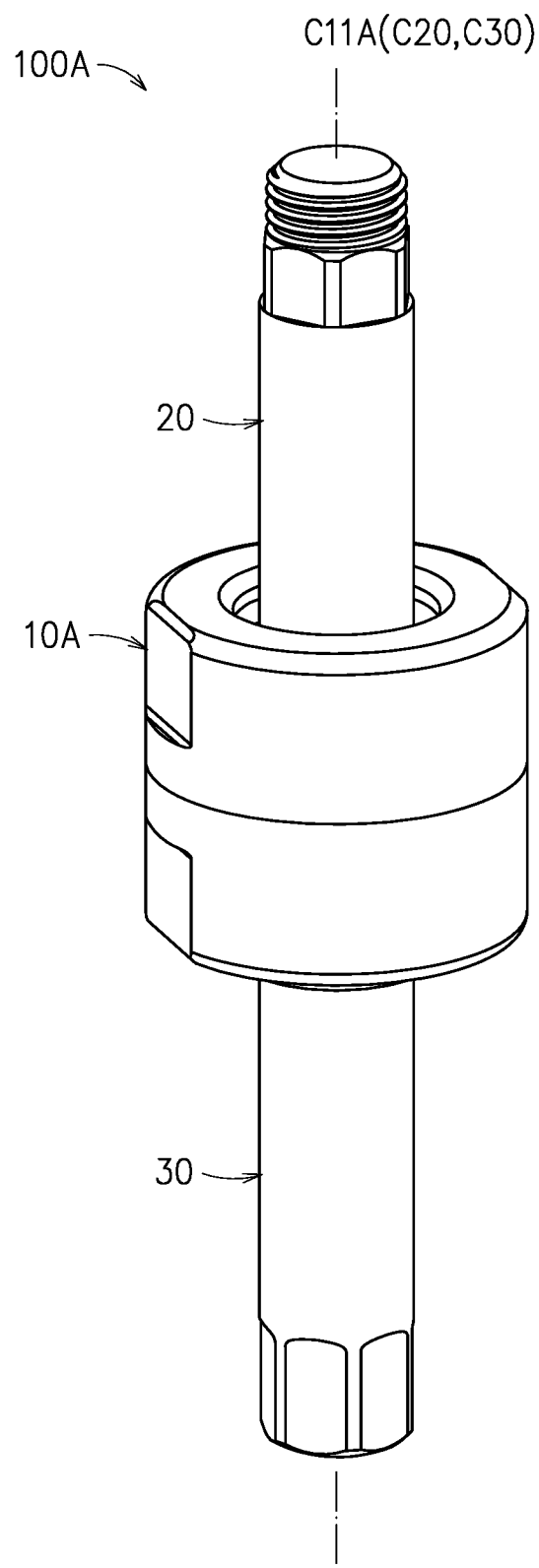
FIG. 5 is a schematic perspective view of another embodiment of the spine connecting rod in accordance with this disclosure.
Figure 6:
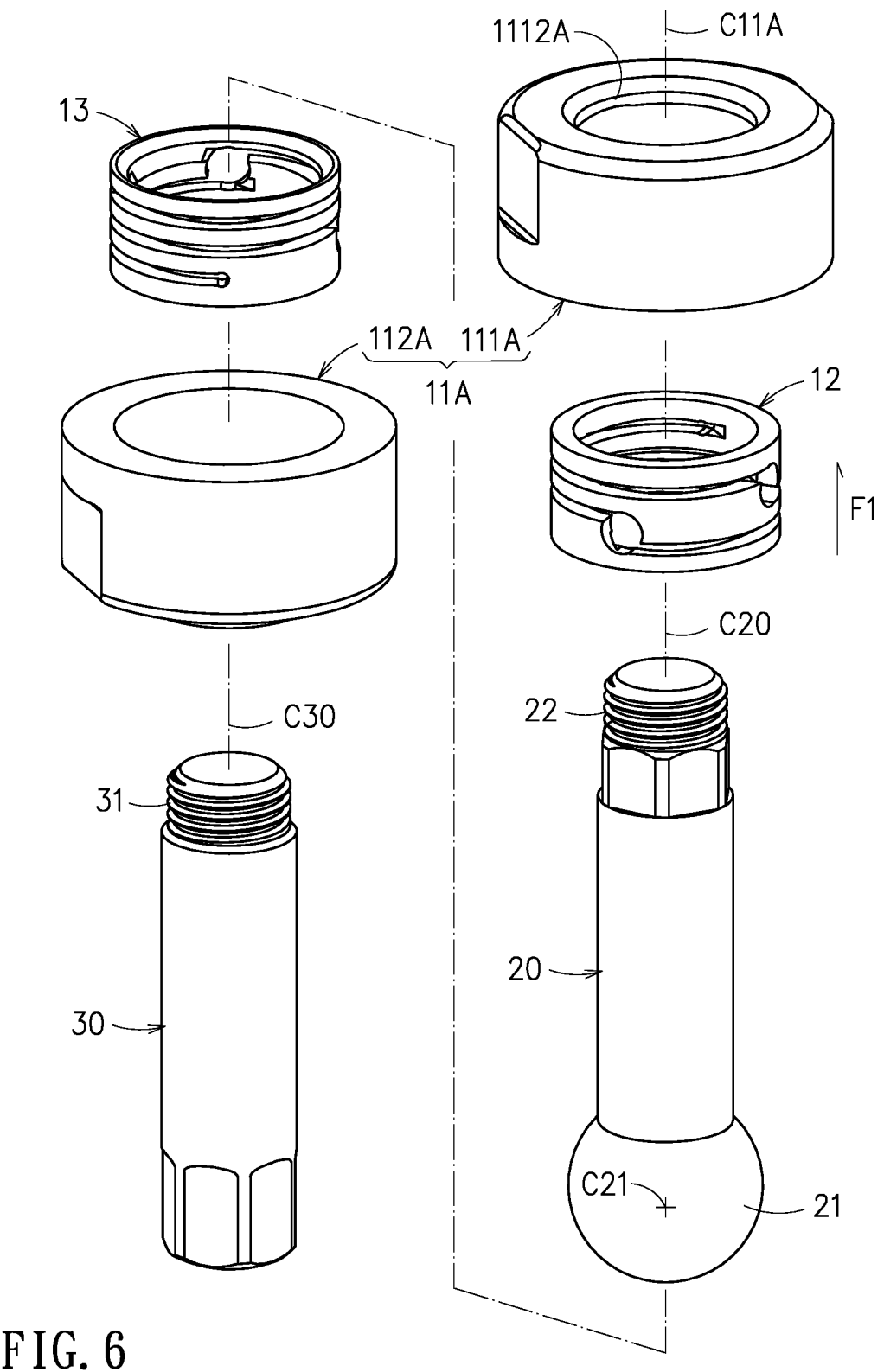
FIG. 6 is a schematic exploded view of FIG. 5.

A major difference between this embodiment and that of FIG. 5 is that, in this embodiment, the body 11B is shaped as a spindle tapered at both ends.

The first coupling part 111B is provided with an annular chamfer 1115B connecting a top surface 1113B that exposes the first rod 20 and an outer sidewall 1114B of the first coupling part 111B. On the other hand, the second coupling part 112B is provided with an annular chamfer 1126B connecting a bottom surface 1124B that exposes the second rod 30 and an outer sidewall 1125B of the second coupling part 112B. The first coupling part 111B and the second coupling part 112B are coaxially connected. Screws (not shown in the figures) can be applied to connect detachably the first coupling part 111B and the second coupling part 112B. Thereupon, the body 11B can be shaped as a spindle.

Referring to FIG. 9A, the ball 21 of the first rod 20 is rotationally disposed inside the coupling assembly 10B, such that the first rod 20 can rotate or/and swing about the ball 21. Namely, the first rod 20 can undergo elastic movements parallel to the first direction F1 by the spring forces provided by the elastic parts 12, 13.

Figure 2:
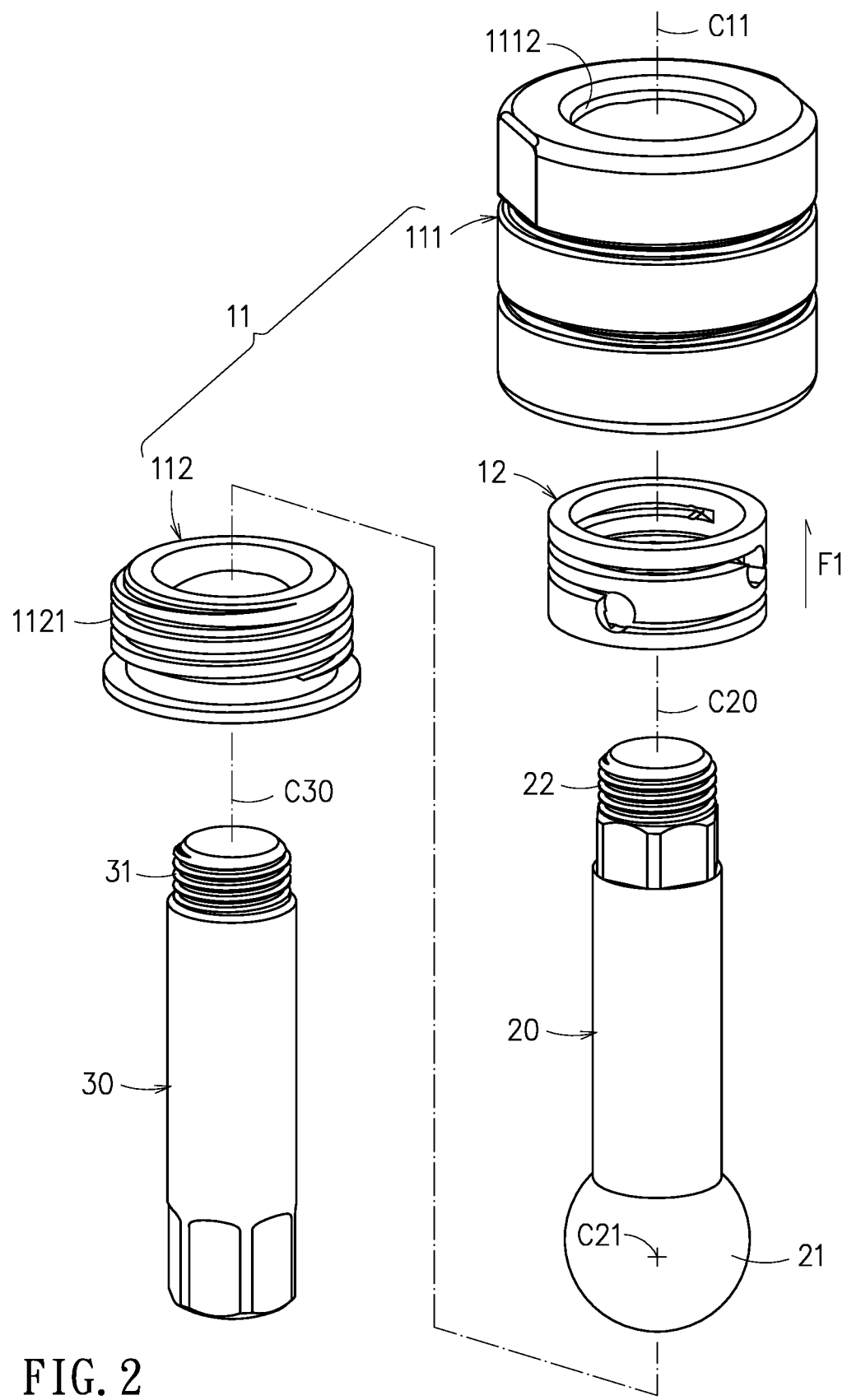
FIG. 2 is a schematic exploded view of FIG. 1.

Referring to the embodiment shown in FIG. 2, FIG. 10, FIG. 11 and FIG. 11A, the first rod 20 of the spine connecting rod 100 of FIG. 2 is extended along the first axis C20 to have another end (i.e., the top end of the first rod 20 in the figure) furnished with a third external thread 22.

Figure 10:
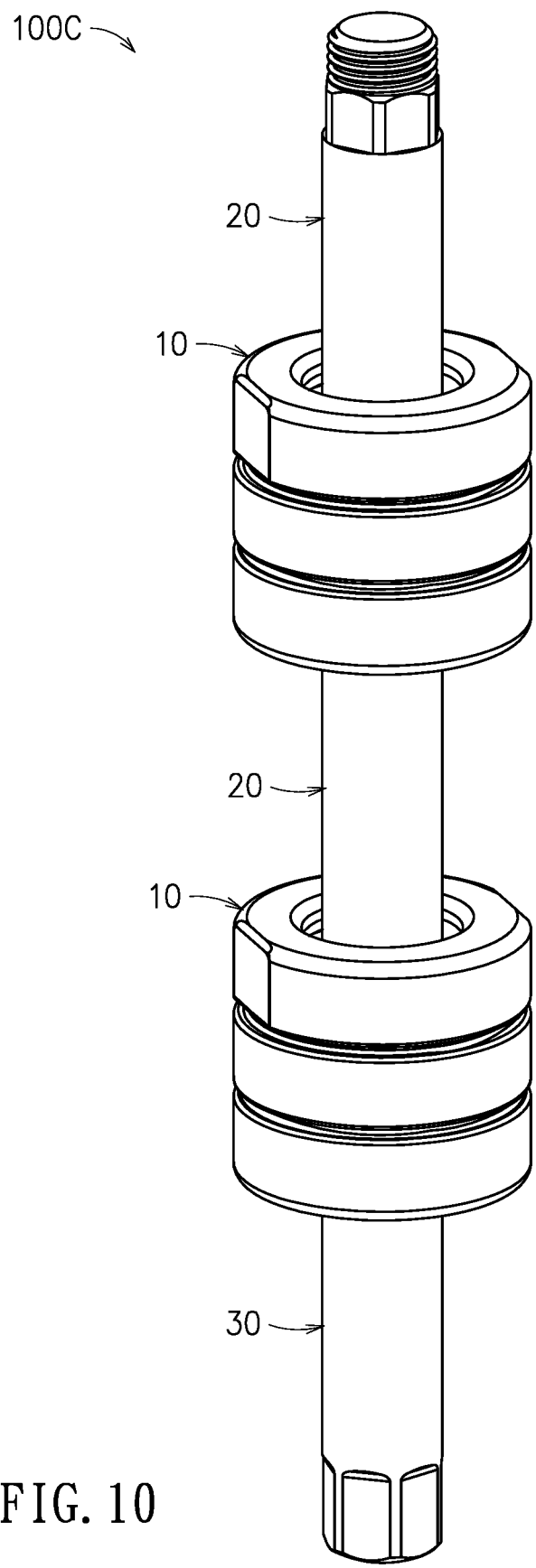
FIG. 10 is a schematic perspective view of two spine connecting rods of FIG. 1 connected in series.
Figure 11:
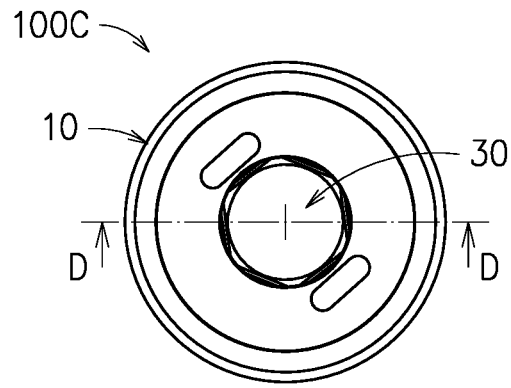
FIG. 11 is a schematic bottom view of FIG. 10.
Figure 11A:
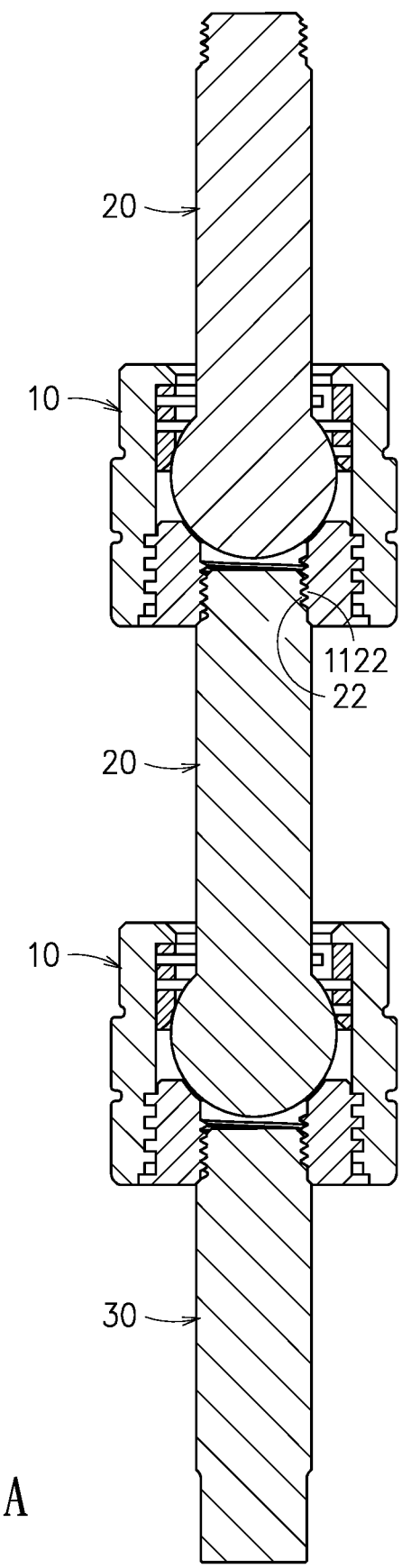
FIG. 11A is a schematic cross-sectional view of FIG. 10 along line D-D.

As shown in FIG. 10 and FIG. 11A, the third external thread 22 is configured to engage the second internal thread 1122 of the second coupling part 112 of another coupling assembly 10. Thereupon, a two-segmented spine connecting rod 100C with two coupling assemblies 10 connected in series can be formed.

Figure 12:
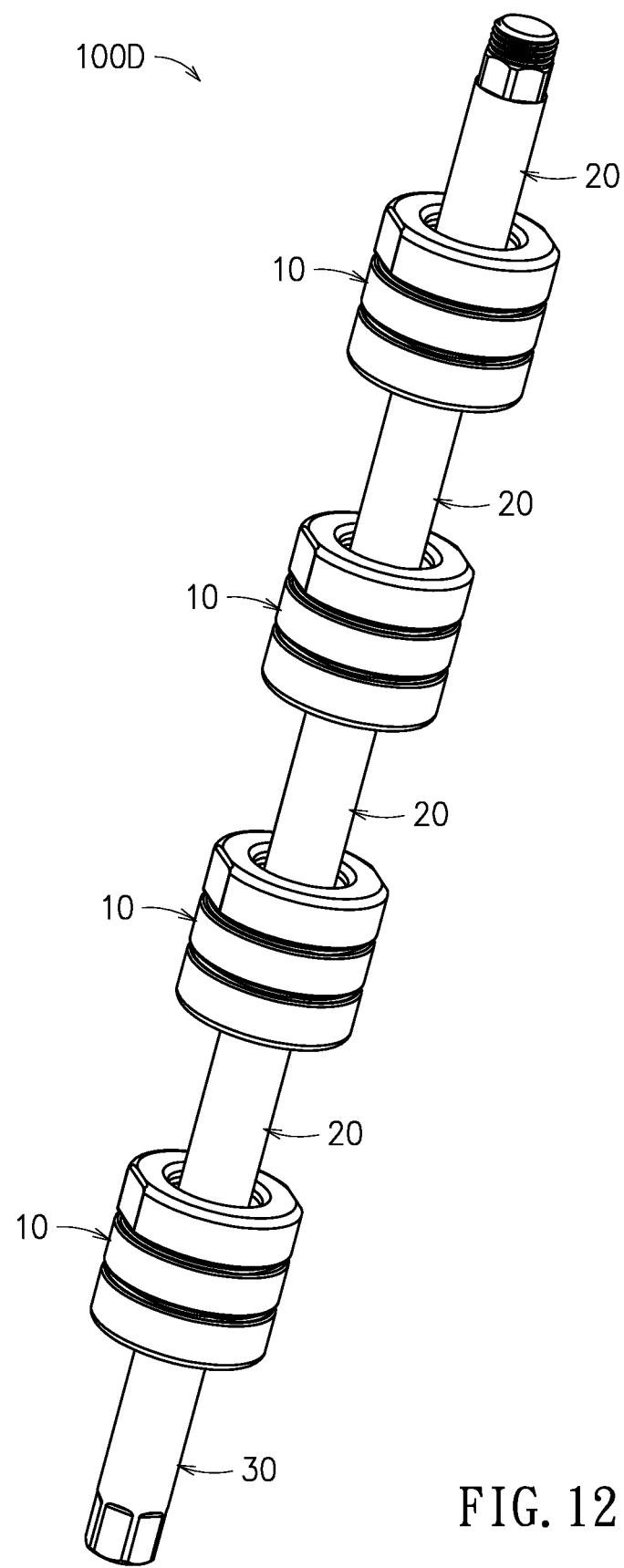
FIG. 12 is a schematic perspective view of a plurality of the spine connecting rods of FIG. 1 connected in series.

By analogy, a three-segmented or multi-segmented spine connecting rod 100D can be formed, as shown in FIG. 12.

Similarly, the spine connecting rod 100A or 100B in FIG. 5 or FIG. 8, respectively, can be applied to form the multi-segmented structure of FIG. 10 or FIG. 12.

Figure 13:
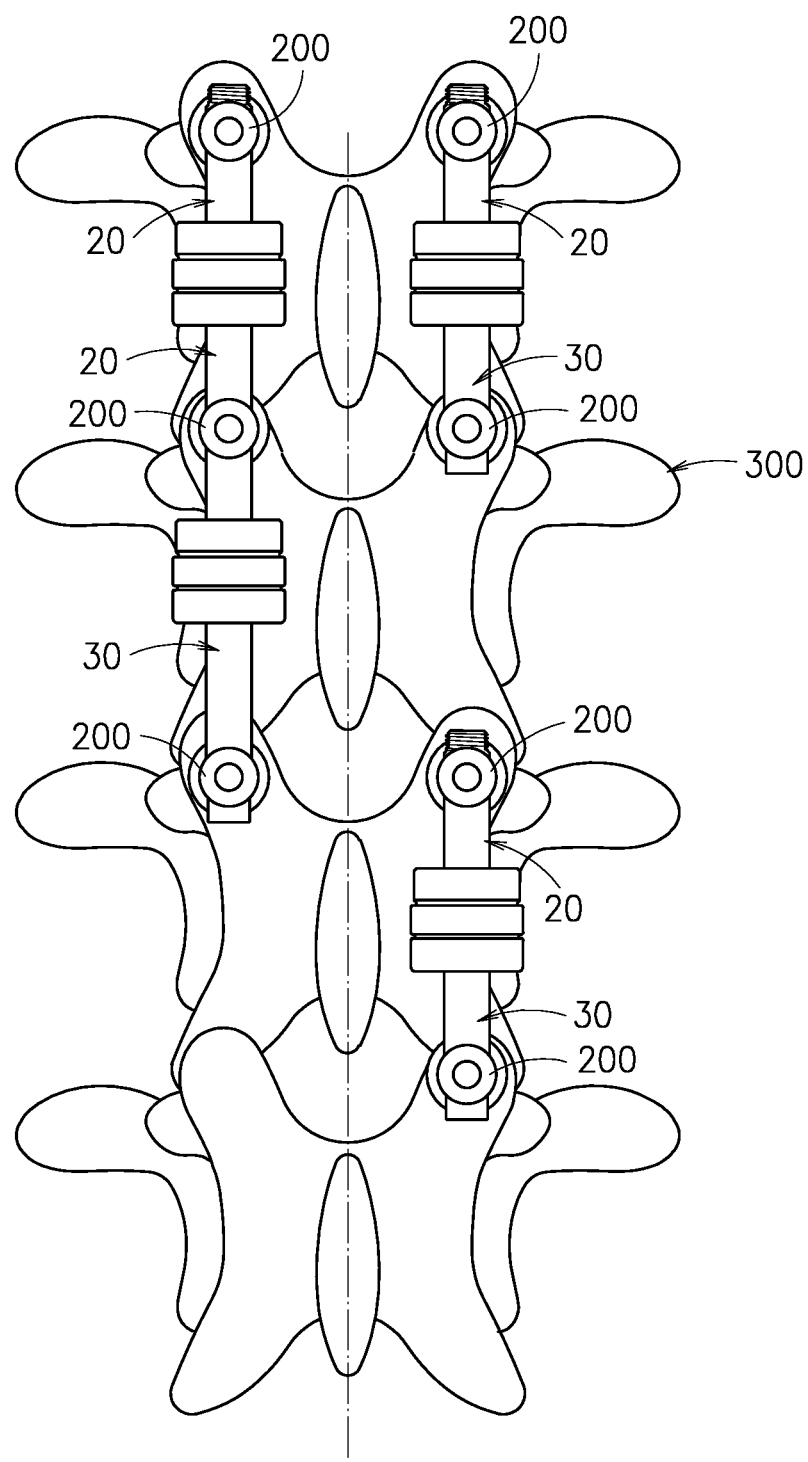
FIG. 13 demonstrates schematically an example of applications of the spine connecting rods of FIG. 1.

Referring to FIG. 13, a plurality of bone nails 200 are planted into corresponding spines 300. As requirements, a plurality of single-segmented spine connecting rods 100 are applied to fix the first rods 20 and the second rods 30 to corresponding bone nails 200. Alternatively, as the multi-segmented spine connecting rod 100C is applied, the first rods 20 and the second rod 30 can be individually fixed to different bone nails 200.

Since the first rod 20 can undergo rotating or/and swinging motions, thus the spines 300 can sustain limited swinging or bending, and so the patient can move much easier and smoother. Similarly, the embodiment of FIG. 5 or FIG. 8 can be also applied to the example of FIG. 13.

In summary, with the spine connecting rod provided in this disclosure, the first rod with the elastic constraint provided by the elastic part can rotate and/or swing elastically about the ball. Thus, advantages of simple structuring, reliable fixation and use comfort can be obtained. In addition, according to practical requirements, a multi-segmented spine connecting rod can be easily structured by connecting multiple single-segmented spine connecting rods in series.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A spine connecting rod, comprising:
   a coupling assembly, including:
      a body, shaped as a cylinder, formed by detachably connecting a first cylindrical coupling part and a second cylindrical coupling part, the body having a body axis parallel to a first direction; and
      at least one elastic part, shaped as a cylinder, detachably disposed inside the body and configured to provide a spring forcing parallel to the first direction;
   a first rod, pivotally connected with the coupling assembly, having a first axis, a diameter of the first rod being smaller than an inner diameters of the at least one elastic part and an inner diameter of the first cylindrical coupling part, one end of the first rod being provided with a ball having a center located at the first axis, a diameter of the ball being greater than the diameter of the first rod, the diameter of the ball being greater than the of inner diameters of both the at least one elastic part and the second cylindrical coupling part, wherein the ball is rotatably disposed inside the coupling assembly and sandwiched between the first cylindrical coupling part and the second cylindrical coupling part, and at least one elastic part is sleeved around the ball abutting against the at least one elastic part; and
   a second rod, detachably connected with the coupling assembly, having a second axis, wherein one end of the second rod along the second axis is provided with a second external thread, the second cylindrical coupling part is provided with a second internal thread such that the second rod is threadingly engaged with the second cylindrical coupling part and the second rod is detachably connected with the second cylindrical coupling part without contacting the at least one elastic part;
   wherein the first rod and the second rod protrude out of the first coupling part and the second coupling part, respectively, the first axis and the second axis are both parallel to the first direction, the ball of the first rod is rotationally disposed inside the coupling assembly so as to allow the first rod to rotate or/and swing about the ball, and the first rod is able to undergo elastic movements parallel to the first direction by the spring forcing provided by the at least one elastic part.

2. The spine connecting rod of claim 1, wherein the coupling assembly has one said at least one elastic part, and the ball is restrained between the elastic part and the second cylindrical coupling part.

3. The spine connecting rod of claim 1, wherein the coupling assembly has two said at least one elastic parts, and the ball is restrained between the two elastic parts.

4. The spine connecting rod of claim 1, wherein the first cylindrical coupling part is furnished with a first internal thread, the second cylindrical coupling part is furnished with a first external thread, and the second cylindrical coupling part is screwed into the first cylindrical coupling part.

5. The spine connecting rod of claim 1, wherein the first cylindrical coupling part and the second cylindrical coupling part are coaxially connected, the first cylindrical coupling part is provided with an annular chamfer to connect a surface exposing the first rod and an outer sidewall of the first cylindrical coupling part, and the second cylindrical coupling part is provided with another annular chamfer to connect another surface exposing the second rod and an outer sidewall of the second cylindrical coupling part.

6. The spine connecting rod of claim 1, wherein the second rod extends along the second axis and is screwed into the second cylindrical coupling part, and the second rod protrudes out of the second cylindrical coupling part.

7. The spine connecting rod of claim 6, wherein the first rod extends along the first axis to have another end furnished with a third external thread for engaging the second internal thread of the second cylindrical coupling part of another said spine connecting rod.

8. The spine connecting rod of claim 1, wherein the first axis, the second axis, the body axis and the center of the ball are coaxial.

* * * * *